United States Patent [19]

Anderson

[11] Patent Number: 5,316,625

[45] Date of Patent: May 31, 1994

[54] APPARATUS FOR SEPARATING A PARTIALLY MISCIBLE SOLVENT FROM WATER

[75] Inventor: George E. Anderson, Champlin, Minn.

[73] Assignee: Crown Iron Works Company, Roseville, Minn.

[21] Appl. No.: 72,032

[22] Filed: Jun. 3, 1993

[51] Int. Cl.[5] .................. B01D 3/38; B01D 17/028; C02F 1/08

[52] U.S. Cl. ................... 202/176; 202/233; 202/234; 202/236; 203/10; 203/39; 203/95; 203/DIG. 16; 210/177; 210/180; 210/182; 210/187; 210/521

[58] Field of Search ............ 202/176, 236, 234, 233, 202/204, 170, 169, 173, 172; 203/10, 11, 39, DIG. 16, 95, 85; 210/177, 180, 182, 187, 521

[56] References Cited

U.S. PATENT DOCUMENTS

| | | | |
|---|---|---|---|
| 2,411,809 | 11/1946 | Rupp et al. | 202/176 |
| 2,514,943 | 7/1950 | Ferris et al. | 202/236 |
| 2,704,742 | 3/1955 | Petrich | 202/176 |
| 3,493,469 | 2/1970 | Porter | 202/176 |
| 3,632,480 | 1/1972 | Surprenant et al. | 202/236 |
| 4,210,494 | 7/1980 | Rhodes | 202/234 |
| 4,299,665 | 11/1981 | Clay et al. | 203/39 |
| 4,664,754 | 5/1987 | Caputi et al. | 203/39 |
| 5,132,011 | 7/1992 | Ferris | 210/187 |
| 5,236,555 | 8/1993 | Yuan | 202/176 |

Primary Examiner—Wilbur Bascomb, Jr.
Attorney, Agent, or Firm—Lawrence M. Nawrocki

[57] ABSTRACT

An apparatus for separating a partially miscible solvent from a contaminated water stream. The apparatus includes a fully enclosed containment vessel having an internal volume bounded by a plurality of walls which define the width, length and height of the internal volume. Devices for feeding the contaminated water, for discharging a solvent rich vapor stream, and for discharging a purified water stream are provided. A dam separates the internal volume into a phase separation zone and a falling film stripping zone with the dam located proximate one end of the internal volume. The dam includes a wall sealably disposed across the entire width of the internal volume and extended upward to a terminal location a distance from the bottom of the internal volume over a portion of the height of the internal volume. In use, the dam determines and maintains a maximum liquid level in the phase separation zone. Any additional liquid added to the phase separation zone results in a film of liquid flowing into the dam over the falling film stripping zone. The falling film stripping zone includes a surface whereon the film of liquid flows toward the device for discharging the purified water. Devices for heating the film of liquid and water contained in the phase separation zone are also provided. The phase separation zone includes a plurality of baffles disposed therein.

24 Claims, 1 Drawing Sheet

APPARATUS FOR SEPARATING A PARTIALLY MISCIBLE SOLVENT FROM WATER

TECHNICAL FIELD

The present invention relates generally to methods and apparatus for treating contaminated fluids. More narrowly, it is directed to a method and apparatus for separating a solvent from a contaminated water stream. The apparatus and method are particularly useful for separating a slightly or partially miscible solvent from water utilizing phase separation and heat stripping. The present invention is particularly useful for separating solvents which form an azeotrope with water.

BACKGROUND OF THE INVENTION

The use of organic solvents or other volatile hydrocarbons in processing chemicals for industrial and consumer use is generally known. Solvents known to be useful include organic compounds like hexane, heptane, toluene, benzene, and other hydrocarbons. Within these processes, organic solvents may come into contact with water. Water thus contaminated with an organic solvent must be treated prior to disposal or reuse by removing the organic solvent to meet regulations targeted to prevent detrimental environmental impacts.

It is known that many of the organic solvents or volatile hydrocarbons are only slightly miscible or partially miscible in water. Thus, the most common way to separate at least a portion of the organic solvent from the water is by gravity or phase separation in which the relatively low solubility of the solvent in the water causes the solvent to separate from the water and form a solvent layer and a water layer with a phase boundary therebetween. However, for purposes of waste water treatment, the separation by gravity is insufficient to purify the water to a point where it may be safely discharged to the environment. Small concentrations of organic solvents or volatile hydrocarbons are soluble in the water. For example, the concentration of hexane in water ranges from 0.02 wt. % at 70° F. to 0.08 wt. % at 110° F. To meet existing and proposed environmental regulations, the concentration of organic solvents must be reduced to near zero before discharging a waste water stream.

Another known property of organic solvents or volatile hydrocarbons in water systems is that many organic solvents form an azeotrope with water at certain concentrations. Thus, the azeotrope prevents a complete separation of the organic solvent from water by heating. Using a hexane/water system as an example, while water boils at 212° F. at atmospheric pressure and hexane boils at 156° F. at atmospheric pressure, a hexane water azeotrope which boils at approximately 142° F. is formed. The azeotrope concentration is approximately 94% hexane and 6% water. Thus, to reduce the concentration of the solvent to near zero by heating a liquid stream and removing a vapor containing most of the solvent, a concentration of water at least equal to the azeotropic concentration must also be removed with the solvent.

An example of a process which utilizes an organic solvent which becomes mixed with water is the process utilized to extract oil from soybeans. In this process, it is known to use hexane to extract soybean oil from the seed after it is ground. The spent solvent contains water and is phase separated to remove most of the hexane from the water. However, a small quantity of hexane is soluble in the water. This waste water must be treated prior to discharge into a sewer, lake or river to strip the water of all significant traces of hexane.

One prior art device utilized to treat the solvent containing waste water stream includes an enclosed vessel into which the waste water is pumped proximate the bottom of the enclosed vessel. A wall extends upward from the bottom of the vessel over a portion of the height to separate the lower portion of the internal volume into two areas. As the waste water enters the first side of the internal volume of the vessel, sparge steam or direct steam is added to the water to heat it rapidly. This heat causes some of the hexane to vaporize. The remaining water is allowed to exit the vessel through the other side of the internal volume.

Applicants have found that such system requires operating temperatures as high as 205° F. to remove substantially all of the solvent in a hexane/water system. This requires an excessive amount of energy and is not economically efficient. Finally, the design of the apparatus gives uneven flow and low surface contact area which contributes to the device's inefficiency. Further, the device is unable to compensate for an upset in which a larger quantity of solvent enters the treatment process and could be separated by phase separation.

Another known apparatus also utilizes an enclosed vessel with counter-current flow of liquid and vapor in a vertical direction to separate the solvent. Liquid in the bottom of the vertical vessel is heated to vaporize a portion of the solvent and water. This design also includes trays which extend part of the way across the width of the vertical vessel to cause mixing of the streams being separated. This system also requires high energy input to reduce the concentration of solvent to acceptable levels due to the inefficiency created by low surface area contact. Further, this system does not compensate for upsets in which the concentration of the solvent may be increased to the point where phase separation would assist in purifying the water stream.

Accordingly, the need exists for a method and apparatus for efficiently reducing the solvent concentration or volatile hydrocarbon concentration in a waste water stream to near zero. An apparatus and method to remove such solvents should provide high surface area to increase the efficiency of separation and should incorporate features which allow phase separation of the solvent from the water by gravity during an upset in which the solvent concentration is greater than the solubility of the solvent within the water. Further, the apparatus should minimize energy consumption by incorporating features which allow complete separation of the azeotrope at reduced temperatures due to increased efficiency of separation. Finally, the apparatus should be designed as a simple, relatively compact unit incorporating each of the above features so that a user may readily install such treatment device for use on existing waste water streams and associated equipment with minimal capital investment.

The present invention addresses these needs as well as other problems associated with existing methods and apparatus for treating contaminated water streams containing a partially miscible solvent. The present invention also offers further advantages over the prior art and solves problems associated therewith.

SUMMARY OF THE INVENTION

The present invention is a method and apparatus for separating a solvent or volatile hydrocarbon from a contaminated water stream. By volatile hydrocarbon it is meant to include any compound having a higher volatility than water. The apparatus is particularly useful when separating a solvent or volatile hydrocarbon, which is partially miscible in water, by reducing the concentration of the solvent to near zero. The apparatus is specifically designed and intended to provide a high surface area of contact between the contaminated water and the heat source to increase the efficiency of the separation. Further, the apparatus is specifically designed to compensate for system upsets in which phase separation of the solvent will assist in cleaning the waste water stream. Thus, the apparatus incorporates both phase separation and high surface area stripping within a single device. The device includes means for heating the waste water stream within a phase separation zone, but also includes a falling film stripping zone which incorporates means for heating the waste water when it is in a high surface area film flowing over an inclined surface.

The apparatus for separating a partially miscible solvent in a contaminated water stream includes a fully enclosed containment vessel having an internal volume bounded by a plurality of walls. The walls of the vessel define a length, a width and a height of the internal volume. The internal volume also has a first end and a second end defined at each end of the length of the vessel.

The apparatus includes means for feeding the contaminated water into the internal volume of the containment vessel located proximate the first end of the internal volume. The apparatus also includes a means for discharging a solvent vapor stream proximate the first end of the internal volume. Finally, the apparatus includes means for discharging a purified water stream proximate the second end of the internal volume.

Together these means allow feeding a waste water stream into the internal volume of the containment vessel proximate the first end of the vessel and discharging a purified water stream proximate the second end of the containment vessel, while a counter-current vapor stream flows in a vapor space from the second end of the containment vessel toward and out a vapor outlet, the means for discharging a solvent rich vapor, proximate the first end of the containment vessel.

A dam separates the internal volume of the containment vessel into a phase separation zone and a falling film stripping zone. The dam is located proximate the second end of the internal volume spaced a distance from the second end of the internal volume and positioned between the first end of the internal volume and the means for discharging a purified water stream. The dam includes a wall sealably disposed across the entire width of the internal volume and extending to a terminal location, or top edge, upward from the bottom of the internal volume over a portion of the height of the internal volume. In use, the dam determines and maintains a maximum liquid level in the phase separation zone approximately equal to the height of the dam.

Any additional material which is added to the phase separation zone through the means for feeding contaminated water results in a film of liquid flowing over the terminal location or top edge of the dam into the falling film stripping zone. Because the dam extends upward only a portion the height of the internal volume, a vapor space remains proximate the top of the internal volume over the entire length of the internal volume to allow a counter-current flow of vapor toward the means for discharging a solvent rich vapor stream from the falling film stripping zone. The solvent rich vapor stream thus contacts the surface of the contained liquid wherein further separation and enrichment of the vapor occurs.

The falling film stripping zone includes a surface whereon the film of liquid which flows over the top edge or terminal location of the dam flows toward the means for discharging a purified water stream. This surface is preferably inclined. Means for heating the film of liquid as it flows toward the means for discharging the purified water stream are provided. The combination of a liquid film and heat provides an efficient separation of the solvent or volatile hydrocarbon from the waste water due to high surface area.

The phase separation zone which includes a maintained level of contaminated waste water has a plurality of baffles disposed therein and extending across the entire width of the internal volume. The height of the baffles extends from an elevation higher than the height of the dam downward to a terminal location above the bottom of the internal volume. In use, the baffles cause mixing of the liquid in the phase separation zone as the liquid progresses from the means for feeding contaminated water to the falling film stripping zone. The baffles also trap any solvent which phase separates from the water due to the immiscibility with the contaminated water. This phase separated solvent is removed by vaporization due to heat being added at various points in the apparatus, as described below.

The apparatus in general will have use in treating waste water containing solvents or volatile hydrocarbons which are partially or slightly miscible in water. Many organic solvents have this property. Some of these solvents would include such volatile hydrocarbons as hexane and heptane.

The means for feeding a contaminated water stream, the means for discharging a solvent rich vapor stream, and the means for discharging a purified water stream can include any conventional technology. For example, each means may include a nozzle having a hole therethrough penetrating the wall of the containment vessel. Further, the means for discharging a purified water stream may include a liquid trap which incorporates a U-shaped conduit extending downwardly from the containment vessel so that vapor will not flow out of the means for discharging a purified water stream.

The dam which separates the containment vessel into a phase separation zone and a falling film stripping zone can include a weir contiguous with the terminal location or the top edge of the dam. The weir can have a plurality of V-shaped notches on an upper edge across at least a portion of the width of the internal volume. The V-shaped notches, in use, form the film of liquid as the liquid passes through the V-shaped notches. Alternatively, these notches could be holes or semi-circles passing through the weir.

The means for heating the film of liquid can include a nozzle which can also incorporate a distributor, penetrating the containment vessel wall proximate the inclined surface. Sparge steam or direct stream may be added to contact and heat the film of liquid, thus, causing separation of the lower boiling solvent or solvent/water azeotrope. The means for heating the film of liquid can also include a manifold which is disposed between the falling film stripping side of the dam and the opposing surface of the surface or inclined surface. A heating medium, such as steam or other heat transfer fluid, may then flow through this manifold to heat the thin film of liquid by conduction through the wall of the inclined surface. Again, separation of the solvent and/or its azeotrope as a vapor occurs.

The apparatus of the present invention can also include a plurality of curtains disposed at locations within the phase separation zone. One of the plurality of curtains can be disposed between each pair of the plurality of baffles. Each of the plurality of curtains can extend across the entire width of the internal volume and downward from the top of the internal volume to a location above the surface of the maintained liquid level. These curtains cause mixing of the vapor as it flows generally from the second end of the containment vessel toward and out of the means for discharging a solvent rich vapor. Also, the vapor contacts the surface of the maintained liquid level to further purify and concentrate the solvent or azeotrope.

In the preferred embodiment, in the baffles and curtains are so disposed to cooperate and create counterflow vapor spaces of different solvent rich concentration. The concentration of a solvent in the vapor space increases as the vapor flows toward the solvent rich vapor discharge. The baffles and curtains help to generate velocity which redirects the lower concentration vapors to sweep across the contained liquid and encourage contact so as to promote volatile hydrocarbon or solvent removal from the liquid. Without this velocity, it is believed that the heavy solvent vapors, such as hexane, would settle down against the liquid and reduce the tendency of hexane to leave the liquid and allow steam or other heating medium to bypass the surface of the contained liquid by flowing along the top of the vapor space.

The present apparatus can also includes means for heating the contaminated water stream maintained within the internal volume proximate the means for feeding the contaminated water. This means can include a steam manifold having holes therethrough for distributing sparge steam into the internal volume to contact the liquid. In use, the heating of the contaminated water within the containment vessel reduces the heat load necessary to complete the separation within the falling film stripping zone. Further, some solvent can be separated in the phase separation zone from the contaminated water and flow into the vapor space and out the means for discharging a solvent rich vapor stream prior to reaching the falling film stripping zone.

The gross separation in the phase separation zone by phase separation and heating with some vaporization of solvent reduces the load capability required in the falling film stripping zone. Thus, the combination of a rough separation of solvent from the contaminated water within the phase separation zone due to heating of the contaminated water in combination with the finishing separation in the falling film stripping zone reduce the solvent concentration to near zero. This is further facilitated by countercurrent contact between the vapor and contained liquid surface as the vapor flows from one end of the unit to the other. If necessary, an auxiliary means for heating contaminated water within the internal volume can additionally be disposed within the liquid in the phase separation zone.

These and various other advantages and features of novelty which characterize the present invention are pointed out with particularity in the claims annexed hereto and forming a part hereof. However, for a better understanding of the invention, its advantages, and the object obtained by its use, reference should be made to the drawings which form a further part hereof, and to the accompanying descriptive matter in which there are illustrated and described preferred embodiments of the present invention.

BRIEF DESCRIPTION OF THE DRAWING

In the drawings, in which like reference numerals indicate corresponding parts or elements of preferred embodiments of the present invention throughout the several views.

DETAILED DESCRIPTION OF THE INVENTION

Detailed embodiments of the present invention are disclosed herein. However, it is to be understood that the disclosed embodiments are merely exemplary of the present invention which may be embodied in various systems. Therefore, specific details disclosed herein are not to be interpreted as limiting, but rather as a basis for the claims and as a representative basis for teaching one of skill in the art to variously practice the invention.

Figure 1:
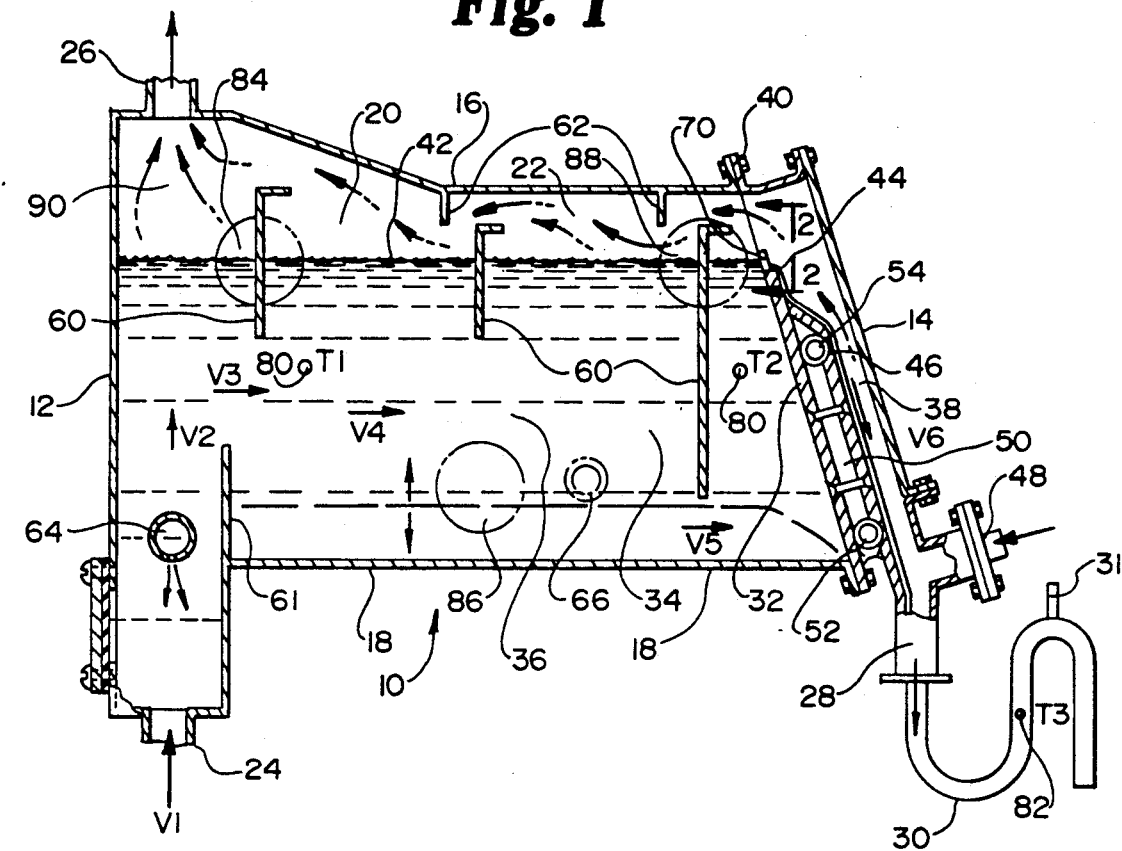
FIG. 1 is a simplified side elevational diagram of the present invention with parts cut away.

Referring now to FIG. 1, a simplified side elevational view of one embodiment of the present invention, with parts cut away, is depicted. The apparatus for separating a solvent or volatile hydrocarbon, particularly a partially miscible solvent, from a contaminated water stream includes a fully enclosed containment vessel 10. A fully enclosed containment vessel 10 can be any vessel having a plurality of walls which surround and sealably define an internal volume 20. General shapes and sizes may be varied without being beyond the scope of the present invention. One of skill in the art would select the general shape and size on the basis of contaminants being separated, quantity of contaminant present, volume of overall flow through the apparatus, and overall reduction in solvent required.

The containment vessel 10 may be manufactured from carbon steel, stainless steel, or other metal to fit the service or corrosion requirements. In a preferred embodiment, carbon steel is utilized due to reduced cost. The material selection is not critical to operation of the unit as long as the material withstands the operating temperatures and corrosive effects of the materials fed through the containment vessel 10.

The fully enclosed containment vessel 10 having an internal volume 20 is bounded by a plurality of walls 12, 14, 16, 18. The plurality of walls define a width, a length, and a height of the internal volume 20. The internal volume further has a first end and a second end, one at each end of the length.

In a preferred embodiment, the plurality of walls include a forward bulkhead 12 and a rearward bulkhead 14 spaced a horizontal distance from the forward bulkhead 12 to define the length of the internal volume 20. A first side wall 22 and a second side wall (not shown) each having a surface spaced generally horizontally from one another to define the width of the internal volume 20 are also included. Each of the side walls further has a first end and a second end, with the first end of each side wall connected to the forward bulkhead 12 and the second end of each of the side walls connected to the rearward bulkhead 14.

In the above embodiment, a bottom wall 18, is included, having both a first end and a second end extending across the width of the internal volume 20. The bottom wall is connected to each of the side walls and extends the length of the internal volume with the first end of the bottom wall 18 terminating proximate the forward bulkhead 12 and the second end of the bottom wall 18 terminating proximate the rearward bulkhead 14.

The above embodiment also includes a top wall 16 which includes a first end and a second end spaced vertically from the bottom wall 18. The top wall 16 extends across the width of the internal volume with the first end of the top wall 16 terminating proximate the forward bulkhead 12 and the second end of the top wall 16 terminating proximate the rearward bulkhead 14.

In each embodiment of the apparatus of the present invention, means for feeding the contaminated water stream 24 are included proximate the first end of the internal volume 20. In a preferred embodiment, the means for feeding the contaminated water stream 24 into the internal volume 20 is located proximate the forward bulkhead 12 and the bottom wall 18.

The means for feeding the contaminated water stream 24 can include a nozzle having a hole therethrough penetrating the wall of the containment vessel 10. It is to be understood that means for feeding a contaminated water stream can include any known piping or conduit connection to a vessel which is commercially available, such as flange connections, threaded connections, or quick connects. In each instance a hole penetrates the containment vessel to allow flow of waste water into the internal volume 20. In preferred embodiments, the contaminated water is fed into the containment vessel 10 below the surface 42 of a liquid level.

All embodiments also include a means for discharging a solvent rich vapor stream 26 located proximate the first end of the internal volume 20. In a preferred embodiment, the means for discharging a solvent rich vapor stream 26 are located proximate the forward bulkhead 12 and the top wall 16. As with the means for feeding a contaminated water stream 24, the means for discharging a solvent vapor stream 26 can include a nozzle having a hole therethrough penetrating the wall of the containment vessel 10. Further, it is understood that any known means for connecting such means may be included, as described above.

Finally, each embodiment also includes means for discharging a purified water stream 28. Such means is located proximate the second end of the internal volume 20. In a preferred embodiment, the means for discharging a purified water stream 28 is located proximate the rearward bulkhead 14 and the bottom wall 18. The means for discharging a purified water stream 28 can include any of the structures described above for means for discharging a solvent rich vapor stream 26 or the means for feeding a contaminated water stream 24.

The means for discharging a purified water stream 28 can also include a liquid trap 30 which comprises a U-shaped conduit extending downward from the containment vessel 10 so that a quantity of liquid is trapped therein which prevents the flow of vapor out of the means for discharging a purified water stream 28. A vent line 31 extending upward from the termination of the U-shaped liquid trap 30 can also be included to prevent siphoning of the contents of the liquid trap 30.

A dam 32 separates the internal volume 20 into a phase separation zone 36 on the forward bulkhead 12 side of the dam 32 and a falling film stripping zone 38 on the rearward bulkhead 14 side of the dam 32. The dam is positioned between the first end of the internal volume 20 and the means for discharging a purified water stream 28, proximate the second end of the internal volume 20.

The dam 32 includes a wall sealably positioned across the width of the internal volume 20 and extends upward to a terminal location 40 or top edge 40 of the dam 32. Thus, the dam 32 is sealably positioned across the width of the internal volume and extending upward from the bottom wall 18. The dam 32 extends upward over only a portion of the height of the internal volume 20. In use, the dam 32 maintains a liquid volume 34 at a specific level on the forward bulkhead 12 side of the dam 32. Thus, the dam 32 determines a maximum liquid level or surface level 42 and a volume of liquid 34 maintained in the containment vessel 10. The height of the liquid or location of the surface level 42 is approximately equal to the height of the dam 32 at its terminal location 40. Any additional liquid which is added to the phase separation zone 36 results in a film of liquid 44 flowing over the dam 32 into the falling film stripping zone 38.

The falling film stripping zone 38 also includes a surface, preferably an inclined surface 46, extending across the width of the internal volume 20 from the top edge 40 or terminal location of the dam 32 to a location proximate the means for discharging a purified water stream 28. Such inclined surface could be vertical with the surface tension of the liquid maintaining contact between the vertical surface and the liquid film. The inclined surface 46 maintains the excess liquid flowing over the top edge 40 of the dam 32 as a film to increase the surface area for efficiently separating solvent from the waste water in the falling film stripping zone 38.

Means for heating the film of liquid 44 on the surface or inclined surface 46 to facilitate solvent separation are provided. The means for heating the film of liquid 44 can include a nozzle 48 and a distributor penetrating the containment vessel 10 wall proximate the inclined surface 46. Sparge steam may be added at this point to contact and flow in a counter-current direction to the film of liquid 44. Solvent, or the solvent/water azeotrope, which is vaporized by the steam travels into a vapor space 90 above the maintained liquid level 42 and flows toward the means for discharging a solvent rich vapor stream 26. Thus, the steam flows counter-current to the film 44 as it flows over the surface 46. The high contact area created by the film 44 dramatically increases the efficiency and quantity of solvent removed and results in solvent concentrations approaching zero in the water exiting through the means for discharging a purified water stream 28.

The means for heating the film of liquid 44 can also include a manifold 50 disposed between the falling film stripping zone 38 side of the dam 32 and the opposing surface of the inclined surface 46. A heating medium then flows through the manifold 50 and heats the film of liquid 44 by conduction through the inclined surface 46 wall with resulting vaporization and separation of the lower boiling solvent or water/solvent, as with heating by sparge steam disclosed above. As depicted in FIG. 1, the heat transfer manifold 50 could include inlet piping 52 and outlet piping 54 through which the heat transfer medium, such as steam or other heat transfer fluid may flow.

The phase separation zone 36 includes a plurality of baffles 60 which extend across the entire width of the internal volume 20 from an elevation higher than the height of the dam 32 downward to a terminal location above the bottom, or bottom wall 18, of the internal volume 20. Thus, each of the plurality of baffles 60 extends from the first side wall to the second side wall from a location above the maintained liquid level 42 downward to a location above the bottom wall 18. The plurality of baffles 60 are intermittently disposed at locations between the forward bulkhead 12 and the dam 32. In use, the plurality of baffles 60 cause mixing of the liquid as it flows generally from the means for feeding contaminated water 24 to the falling film stripping zone 38. The baffles also trap any solvent which phase separates and floats on top of the water rich phase due to the immiscibility of the solvent with the contaminated water.

The phase separation zone 36 of the containment vessel 10 is utilized as a first stage to remove a portion of the solvent contained in the contaminated water. In this zone, both phase separation and separation by vaporization can occur. Means for heating the contaminated water 24 fed into the internal volume 20 along with the volume of liquid 34 which is maintained within the internal volume 20 can be provided. This means can include a steam manifold 64 with holes therethrough for distributing sparge steam into the internal volume 20 to contact the liquid fed into the containment vessel 10. Such means can be located proximate the means for feeding contaminated water 24. In this embodiment, a baffle 61 extending upward from the bottom wall 18 may be included to prevent short circuiting of the contaminated water through the phase separation zone 36.

An auxiliary means for heating the contaminated water 66 can also be provided within the internal volume 20 disposed within the maintained liquid volume 34 in the phase separation zone 36. Conventional means such as a heating manifold or steam tube bundle can be included.

The solvents which may be separated by the apparatus of the present invention can include any organic solvents which have a lower boiling point than water. This includes volatile hydrocarbons having a higher relative volatility than water. It can also separate solvents which form an azeotrope with water. It is preferable that solvents which are only slightly, moderately or partially miscible in water are separated within the device of the present invention. These solvents can include such compounds as hexane, and heptane. Although, it is recognized that other intermediate boiling organic solvents could be separated.

Figure 2:
FIG. 2 is a fragmentary detail section taken along line 2—2 of FIG. 1 showing the V-shaped notched weir of one embodiment of the present invention.

Now also referring to FIG. 2, a fragmentary detail section taken along line 2—2 of FIG. 1 depicting a weir 70 which may be utilized in one embodiment of the invention is depicted. The dam 32, in this embodiment, includes a weir 70 contiguous with the top edge 40 or terminal location 40 of the dam 32. The weir 70 can have a plurality of V-shaped notches 72 on an upper edge thereof across at least a portion of the width of the internal volume 20. The V-shaped notches 72, in use, form the film of liquid 44 as it flows through the V-shaped notches 72. Notches of other shapes such as holes or semi-circles could also be utilized.

In one embodiment, one or a plurality of curtains 62 can be disposed within the phase separation zone 36 with at least one of the plurality of curtains located between at least one of a pair of the plurality of baffles 60. Each of the plurality of curtains 62 extends across the entire width of the internal volume 20 downward from the top wall 16 of the internal volume 20 to a location above the surface 42 of the maintained liquid volume 34.

In this embodiment, the baffles 60 and curtains 62 cooperate with one another to create counterflow vapor spaces of different solvent or volatile hydrocarbon content. The concentration of solvent increases as the vapor flows toward the means for discharging a solvent rich vapor stream. The enrichment is due to contact between the surface of the contained liquid and the vapor. The baffles and curtains generate slight velocity which redirects the vapors across the contained liquid surface and encourage contact to promote removal of volatile hydrocarbons or solvent from that liquid. Without this velocity, it is believed that heavier solvent or hydrocarbon vapors, such as hexane, may settle on the contained liquid surface and reduce the tendency of the solvent to leave the liquid and allow steam or other heating medium to bypass the contained liquid surface through the vapor space.

As with any chemical processing equipment, the apparatus of the present invention can include sight glasses 84, 86, 88 located at various locations on the containment vessel 10 to monitor operation of the device. A particularly useful location is proximate the liquid surface 42 to monitor such level. Various temperature monitoring devices 80, 81, 82 such as thermowells with associated thermocouples may also be included. These temperatures may be monitored or may be utilized in a feedback control system to control steam input or heat input at various locations within the apparatus. One of skill in the art would recognize variations suitable for such control schemes.

The operation of the apparatus includes feeding a contaminated waste water stream through a means for feeding waste water 24 into a maintained volume 34 of such contaminated water. Heat can be added to the water as such liquid fed into the system or as it is maintained in the containment vessel. In this way, a first separation occurs in the phase separation zone 36 which causes a portion of the solvent to vaporize and migrate to the vapor space 90 of the containment vessel 10. Further, the plurality of baffles 60 cause mixing of the volume of liquid 34 as such liquid flows from the means for feeding contaminated water 24 toward the top edge 40 of the dam 32. These baffles prevent solvent which phase separates from reaching the falling film stripping zone 38.

The falling film stripping zone 38 operates as a second or refined separation step. This step is utilized to remove the remaining portion of solvent which is unable to be removed in the phase separation zone 36 due to the inefficiency of that zone. The falling film stripping zone 38 separation includes creating a film 44 which flows over the top edge 40 of the dam 32 onto an inclined planar surface 46 which maintains the liquid as a thin film 44. The thin film is contacted by a heating medium which vaporizes remaining solvent in the thin film 44 of liquid. The high surface area provides increased efficiency of removal. The system is designed so that the heating medium flows counter-current to the direction of flow of the thin film 44 and flows into the vapor space 90 above the liquid level 42. The vapor then flows out of the internal volume 20 through the means for discharging the vapor rich stream 26. The film 44 flows downward toward the means for discharging purified water 28. The counter-current flow between the film 44 and means for heating increases the efficiency of separation.

New characteristics and advantages of the invention covered by this document have been set forth in the foregoing description. It will be understood, however, that this disclosure is, in many respects, only illustrative. Changes may be made in details, particularly in matters of shape, size, and arrangement of parts, without exceeding the scope of the invention. The scope of the invention is, of course, defined in the language in which the appended claims are expressed.

What is claimed is:

1. An apparatus for separating a partially miscible solvent from a contaminated water stream, said apparatus comprising:
   (a) a fully enclosed containment vessel having an internal volume bounded by a plurality of walls, said walls of said vessel defining a width, a length and a height of said internal volume, said internal volume further having a first end and a second end at each end of said length;
   (b) means for feeding said contaminated water stream into said containment vessel proximate said first end of said internal volume;
   (c) means for discharging a solvent rich vapor stream proximate said first end of said internal volume;
   (d) means for discharging a purified water stream proximate said second end of said internal volume;
   (e) a dam separating said internal volume into a phase separation zone and a falling film stripping zone, said dam located proximate said second end of said internal volume, positioned between said first end of said internal volume and said means for discharging a purified water stream, said dam including a wall sealably disposed across the entire width of said internal volume and extending upward to a terminal location from the bottom of said internal volume over a portion of the height of said internal volume, wherein in use said dam determines a maximum liquid level in said phase separation zone approximately equal to the height of said dam with any additional liquid added to said phase separation zone resulting in a film of liquid flowing over said dam into said falling film stripping zone;
   (f) said falling film stripping zone including an inclined surface whereon said film of liquid flows toward said means for discharging a purified water stream;
   (g) means for heating said film of liquid as it flows toward said means for discharging a purified water stream; and
   (h) said phase separation zone including a plurality of baffles disposed therein extending across the entire width of said internal volume from an elevation higher than the height of said dam downward to a terminal location above the bottom of said internal volume, wherein, in use, said baffles cause mixing of said liquid in said phase separation zone as said liquid progresses from said means for feeding contaminated water to said falling film stripping zone, said baffles further trapping any of said solvent which phase separated due to immiscibility with said contaminated water.

2. The apparatus of claim 1, wherein said solvents are volatile hydrocarbon compounds.

3. The apparatus of claim 1, wherein said means for feeding a contaminated water stream includes a nozzle having a hole therethrough penetrating the wall of said containment vessel.

4. The apparatus of claim 1, wherein said means for discharging a solvent rich vapor stream includes a nozzle having a hole therethrough penetrating said containment vessel.

5. The apparatus of claim 1, wherein said means for discharging a purified water stream includes a nozzle having a hole therethrough penetrating said containment vessel and a liquid trap, including a U-shaped conduit extending downward from said containment vessel so that vapor will not flow out of said means for discharging a purified water stream.

6. The apparatus of claim 1, wherein said dam further comprises a weir contiguous with said terminal location of said dam, said weir having a plurality of notches on an upper edge thereof across at least a portion of the width of said internal volume, said notches, in use, forming said film of liquid as said liquid flows therethrough.

7. The apparatus of claim 1, wherein said means for heating said film of liquid includes a nozzle and a distributor penetrating said containment vessel wall proximate said inclined surface wherein sparge steam is added to contact and heat said film of liquid.

8. The apparatus of claim 1, wherein said means for heating said film of liquid includes a manifold disposed between said falling film stripping side of said dam and the opposing surface of said surface, wherein a heating medium flows through said manifold to heat said film of liquid by conduction.

9. The apparatus of claim 1, further comprising a plurality of curtains disposed within said phase separation zone, one of said plurality of curtains between each pair of said plurality of baffles, each of said plurality of curtains extending across the entire width of said internal volume and downward from the top of said internal volume to a location above the surface of said maintained liquid level.

10. The apparatus of claim 1, further comprising means for heating said contaminated water stream within said internal volume proximate said means for feeding said contaminated water.

11. The apparatus of claim 10 wherein, said means for heating said contaminated water includes a steam manifold having holes therethrough for distributing sparge steam into said internal volume to contact said liquid.

12. The apparatus of claim 1, further comprising an auxiliary means for heating said contaminated water within said internal volume disposed within said liquid in said phase separation zone.

13. An apparatus for separating solvent impurities from contaminated water, said apparatus comprising:
   (a) a fully enclosed containment vessel having an internal volume bounded by a plurality of vessel walls including,
      (i) a forward bulkhead,
      (ii) a rearward bulkhead spaced a horizontal distance from said forward bulkhead to form a length of said internal volume,
      (iii) a first side wall and a second side wall each having a surface spaced generally horizontally from one another to form a width of said internal volume, each of said side walls further having a first end and a second end, said first end of each side wall connected to said forward bulkhead and said second end of each of said side walls connected to said rearward bulkhead, (iv) a bottom wall having a first end and a second end extending across the width of said internal volume, said bottom wall connected to each of said side walls and extending across the length of said internal volume with said first end of said bottom wall terminating proximate said forward bulkhead and said second end of said bottom wall terminating proximate said rearward bulkhead, (v) a top wall having a first end and a second end, spaced vertically from said bottom wall, extending across the width of said internal volume said first end of said top wall terminating proximate said forward bulkhead and said second end of said top wall terminating proximate said rearward bulkhead;

(b) means for feeding a contaminated water stream into said internal volume proximate said forward bulkhead and said bottom wall;

(c) means for discharging a solvent rich vapor stream proximate said forward bulkhead and said top wall;

(d) means for discharging a purified water stream proximate said rearward bulkhead and said bottom wall;

(e) a dam separating said internal volume into a phase separation zone on the forward bulkhead side of said dam and a falling film stripping zone on the rearward bulkhead side of said dam, said dam located proximate said rearward bulkhead between said forward bulkhead and said means for discharging a purified water stream, said dam including a wall sealably positioned across the width of said internal volume and extending from said bottom wall upward to a terminal location at a top edge of said dam over a portion of the height of said internal volume, wherein in use said dam maintains a liquid level on the forward bulkhead side of said dam and allows excess material to flow over said dam as a film of liquid into said falling film stripping zone;

(f) said falling film stripping zone including an inclined surface extending across the width of said internal volume from the top edge of said dam to a location proximate said means from discharging a purified water stream, wherein said surface maintains said excess liquid as a film to increase surface area for separating solvent therefrom;

(g) means for heating said film of liquid on said inclined surface to facilitate solvent separation; and (h) said phase separation zone including a plurality of baffles extending from said first side wall to said second side wall from a location from a location above, said maintained liquid level downward to a location above said bottom wall, said baffles intermittently disposed between said forward bulkhead and said dam wherein, in use, said plurality of baffles cause mixing of liquid as it flows from said means for feeding contaminated water to said falling film stripping zone.

14. The apparatus of claim 13, wherein said solvents are volatile hydrocarbon compounds.

15. The apparatus of claim 13, wherein said means for feeding a contaminated water stream includes a nozzle having a hole therethrough penetrating the wall of said containment vessel.

16. The apparatus of claim 15, wherein said means for discharging a solvent rich vapor stream includes a nozzle having a hole therethrough penetrating said containment vessel.

17. The apparatus of claim 16, wherein said means for discharging a purified water stream includes a nozzle having a hole therethrough penetrating said containment vessel and a liquid trap, including a U-shaped conduit extending downward from said containment vessel so that vapor will not flow out of said means for discharging a purified water stream nozzle.

18. The apparatus of claim 13, wherein said dam further comprise a weir contiguous with said top edge of said dam, said weir having a plurality of notches on an upper edge thereof across at least a portion of the width of said internal volume, said notches, in use, forming said film of liquid as said liquid flows therethrough.

19. The apparatus of claim 18, wherein said means for heating said film of liquid includes a nozzle and a distributor penetrating said vessel wall proximate said inclined surface wherein sparge steam is added to contact and heat said film of liquid.

20. The apparatus of claim 19, wherein said means for heating said film of liquid includes a manifold disposed between said falling film stripping side of said dam and the opposing surface of said surface, wherein a heating medium flows through said manifold to heat said film of liquid by conduction.

21. The apparatus of claim 20, further comprising a plurality of curtains disposed within said phase separation zone, one of said plurality of curtains between each pair of said plurality of baffles, each of said plurality of curtains extending across the entire width of said internal volume and downward from the top of said internal volume to a location above the surface of said maintained liquid level.

22. The apparatus of claim 21, further comprising means for heating said contaminated water stream within said internal volume proximate said means for feeding said contaminated water.

23. The apparatus of claim 22, wherein said means for heating said contaminated water includes a steam manifold having holes therethrough for distributing sparge steam into said internal volume to contact said liquid.

24. The apparatus of claim 23, further comprising an auxiliary means for heating said contaminated water within said internal volume disposed within said liquid in said phase separation zone.

* * * * *